(No Model.)

P. H. O'NEILL.
WEIGHING SCALE.

No. 347,056. Patented Aug. 10, 1886.

Witnesses:

Inventor:
Philip Henry O'Neill.

UNITED STATES PATENT OFFICE.

PHILIP HENRY O'NEILL, OF BROOKLYN, NEW YORK.

WEIGHING-SCALE.

SPECIFICATION forming part of Letters Patent No. 347,056, dated August 10, 1886.

Application filed January 18, 1886. Serial No. 188,869. (No model.)

*To all whom it may concern:*

Be it known that I, PHILIP HENRY O'NEILL, St. Mary's Hospital, St. Marks avenue, of Brooklyn, in the county of Kings and State of New York, have invented a new and useful Improvement in Beam-Scales, of which the following, taken in connection with the accompanying drawings, is a specification.

Figure 3:
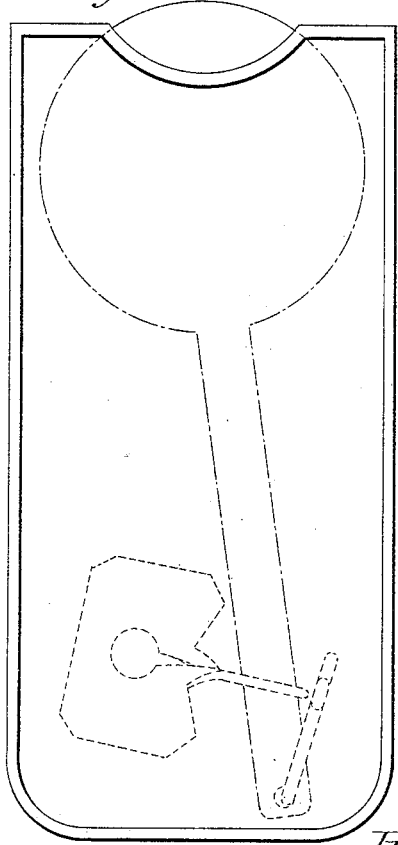

My invention consists of a beam-scale designed to sustain and record from one-half to six ounces, by half-ounce graduations, that can be carried in the pocket. When in its leather case (see Figure 3,) it is two inches wide, five inches long, and less than three-eighths of an inch in thickness, weighing less than two ounces. It is composed of three separable parts: First, the indicator A; second, the disk B and the beam C, and, third, the object-holder D. The upper portion of A is grasped by the thumb and forefinger of the right-hand, and the whole scale held so suspended while in use.

Figure 1:
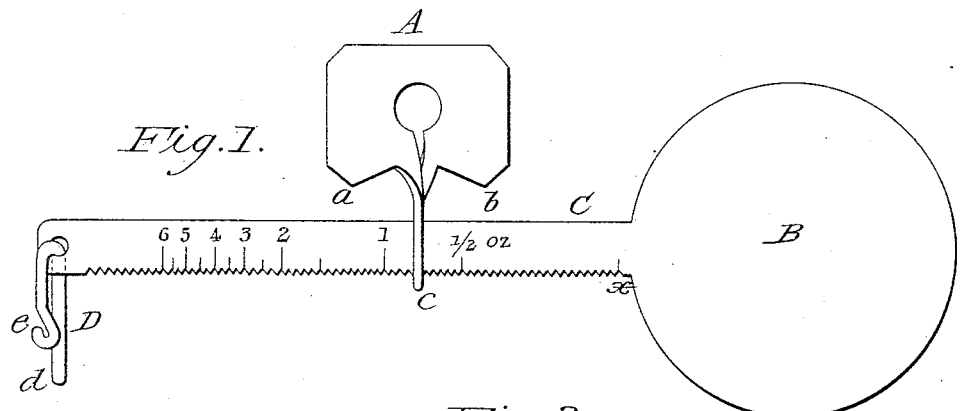
Figure 2:
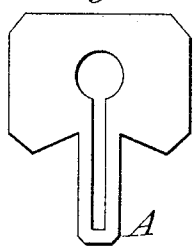

Fig. 2 shows the shape of A before a half-turn is made (giving it the appearance shown in Fig. 1) to enable it to slide on the beam and present itself flatwise in conformity with B, and that the corners $a$ and $b$, Fig. 1, may act as a check on the beam C when off a true balance.

By adjusting the lower portion, A, Fig. 2, to the scores or notches in the bottom of C and referring to the corresponding marks on the face the weight of the object is ascertained. If the object is overweight, the disk will rise, and vice versa. The lower potrion, $c$, Fig. 1, of this part of the scale also serves as the fulcrum, and is movable to any location on the beam, and must be shifted to the various notches to ascertain whether the object is over or under the weight there indicated.

The disk B is the counterbalance-weight. By adjusting the fulcrum $c$ at the point $x$ on the beam the empty scale is maintained in equilibrium. It is also the counterpoise when an object is being weighed, made so by the moving of the fulcrum $c$ to other locations on the beam. It is at all times stationary. The other portion, C, of this part of the scale is constructed with scores or notches in its lower edge corresponding to those appearing on its face to receive and retain the fulcrum. The counterpoise being stationary and the fulcrum movable, these notches will not be equidistant, but will vary in the manner represented in the annexed drawings. The lower left-hand corner of C is bored large enough to admit the object-holder D to pass through and have free action.

The retention of a letter in the object-holder is accomplished by inserting the envelope flatwise between the arms of the spring-clamp at $d$, the hook $e$ to be used for packages, newspapers, &c.

I am aware that there are numerous varieties of beams patented and in use, but they are fitted with a movable counterpoise-weight, which, in most cases, must be augmented as the weight of the object being weighed increases, and that without exception they have the stationary fulcrum, whereas my invention consists of a scale constructed in a different manner, having a movable fulcrum and stationary counterpoise. Therefore,

What I claim, and desire to secure by Letters Patent in the United States, is—

In a weighing-scale, the combination of a beam, C, having a counter-weight, B, at one end and rigid with said beam, an object-holder attached at the other end, with an indicator, A, in which said beam slides, all substantially as described.

In testimony whereof I have signed my name to this specification, in the presence of two subscribing witnesses, on this 13th day of January, A. D. 1886.

PHILIP HENRY O'NEILL.

Witnesses:
 D. A. CASSERBY,
 WILLIAM J. DORAN.